United States Patent [19]

Boodley et al.

[11] Patent Number: 5,588,253
[45] Date of Patent: Dec. 31, 1996

[54] METHOD AND APPARATUS FOR DISPLAYING FLORAL ARRANGEMENTS

[75] Inventors: James W. Boodley, Kent; James P. Noe, Seville; Daniel Hann, Akron, all of Ohio

[73] Assignee: Smithers-Oasis Company, Cuyahoga Falls, Ohio

[21] Appl. No.: 891,393

[22] Filed: May 29, 1992

[51] Int. Cl.$^6$ .................................. A01G 5/00; A47G 7/00
[52] U.S. Cl. .......................................... 47/41.12; 47/41.01
[58] Field of Search .................................. 47/41.12, 41.01

[56] References Cited

U.S. PATENT DOCUMENTS

| | | | |
|---|---|---|---|
| 2,366,377 | 1/1945 | Zois | 47/41.12 |
| 2,618,901 | 11/1952 | Braun | 47/41.12 |
| 3,962,825 | 6/1976 | O'Connell | 47/41.12 |
| 4,058,929 | 11/1977 | O'Connell | 47/41.12 |
| 4,092,801 | 6/1978 | Schoenherr et al. | 47/41.12 |

FOREIGN PATENT DOCUMENTS

| | | | |
|---|---|---|---|
| 2093436 | 9/1982 | United Kingdom | 47/41.12 |
| 2131687 | 6/1984 | United Kingdom | 47/41.12 |

Primary Examiner—Terry Lee Melius
Assistant Examiner—Joanne C. Downs
Attorney, Agent, or Firm—Renner, Kenner, Greive, Bobak, Taylor & Weber

[57] ABSTRACT

A floral support assembly for presenting a display of fresh cut flowers. Floral foam is bonded to a backing to define a pre-shaped configuration. Moisture barrier means, preferably in the form of ambient air spaces, separate the floral foam into adjacent segments of predetermined dimensions, in at least the vertical direction. The barrier spaces have a predetermined width sufficient to prevent floral preservative solution from bridging between adjacent segments when the floral foam support assembly is inclined with respect to a horizontal frame of reference. The preferred method by which to saturate the aforesaid assembly with a floral preservative solution requires a container. At least a sufficient volume of the preservative solution is placed in the container to saturate the foam segments on whatever number of support assemblies are to be simultaneously processed. The support assemblies are then floated in the solution with the foam segments facing the solution. Each assembly is removed from the solution after it has been permitted to sink into the solution to a predetermined depth. The assembly is then inverted and placed on a horizontal surface for a predetermined period of time with the backing resting on that horizontal surface. The stems of flowers may then be inserted into the foam segments to fashion a display.

13 Claims, 6 Drawing Sheets

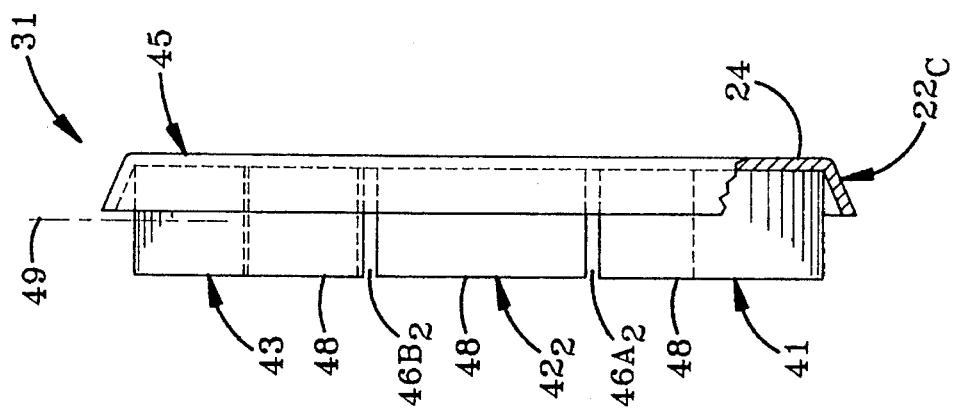
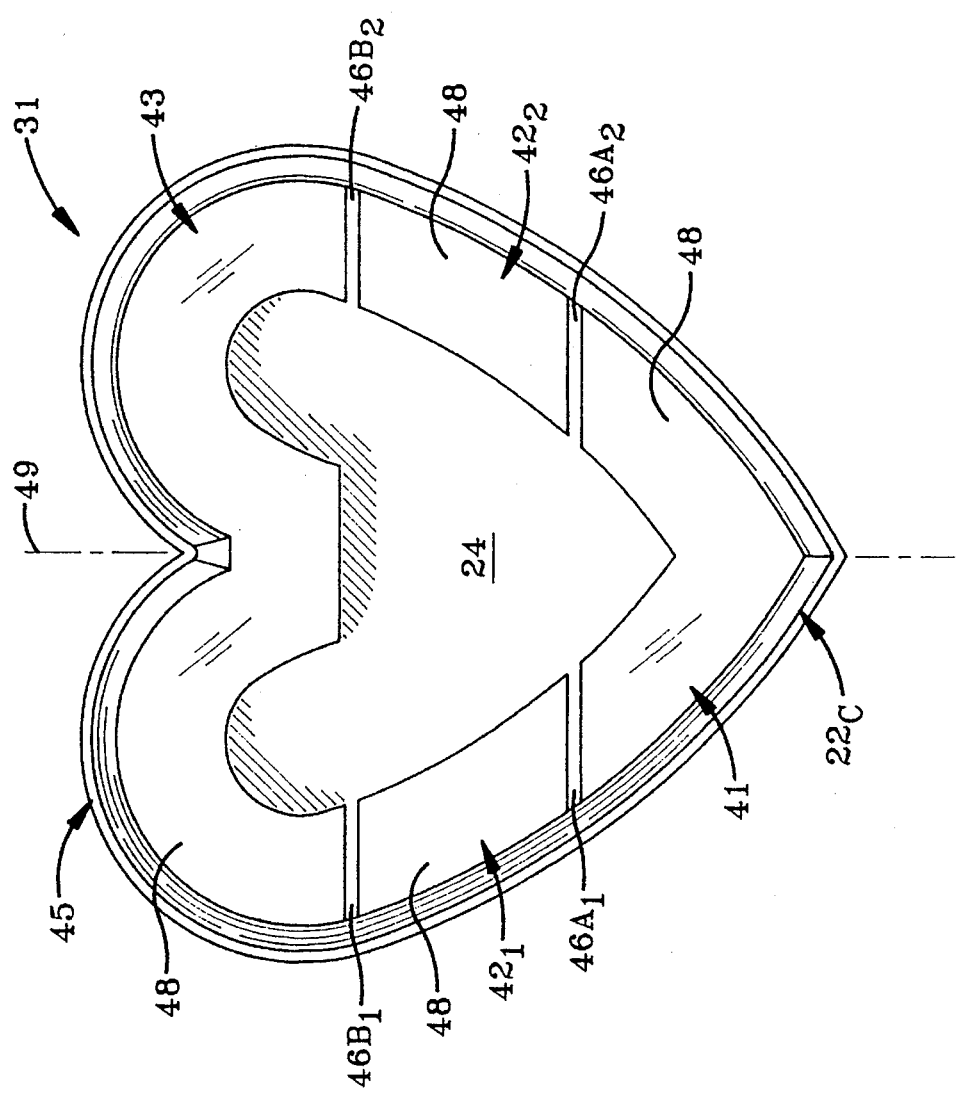
FIG-4
FIG-3

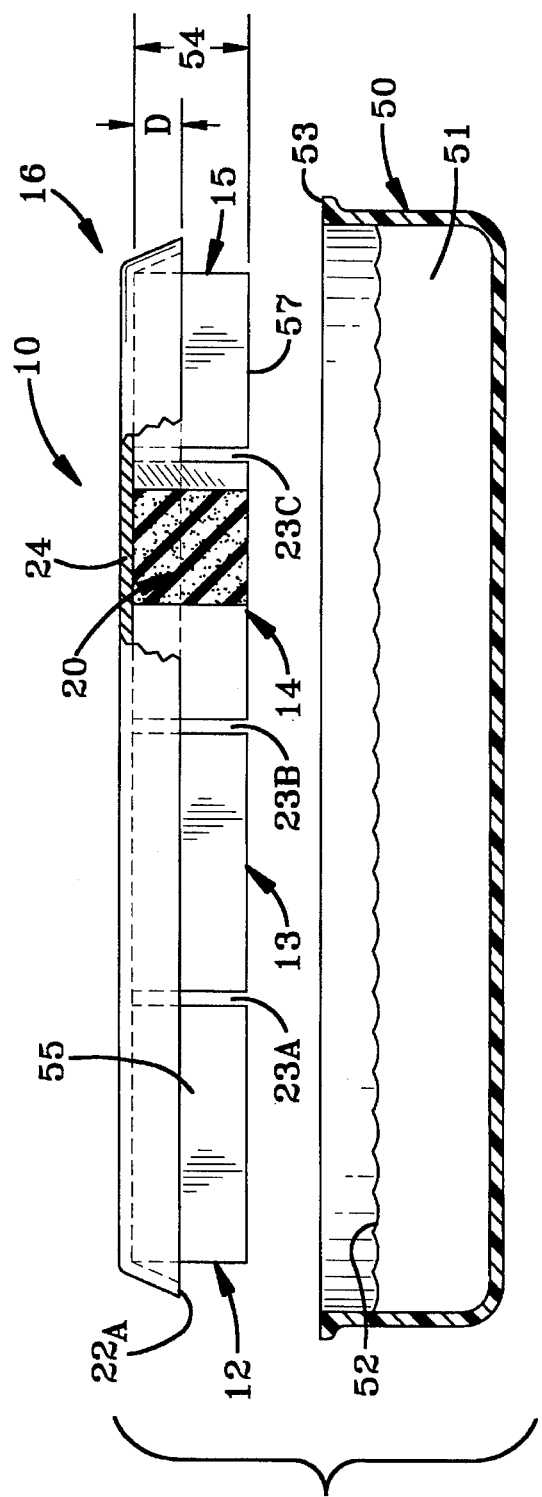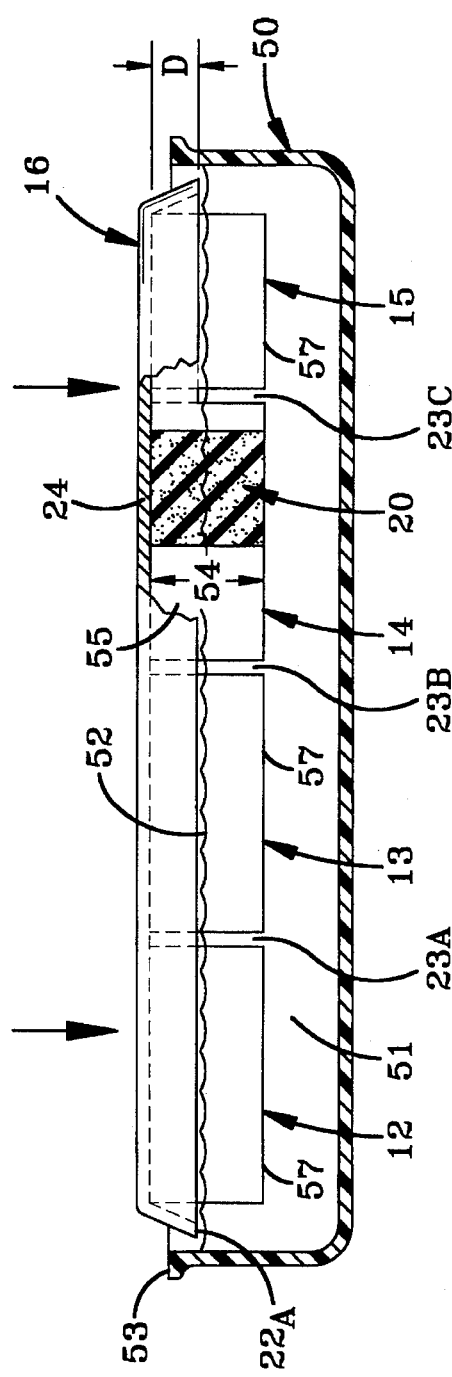

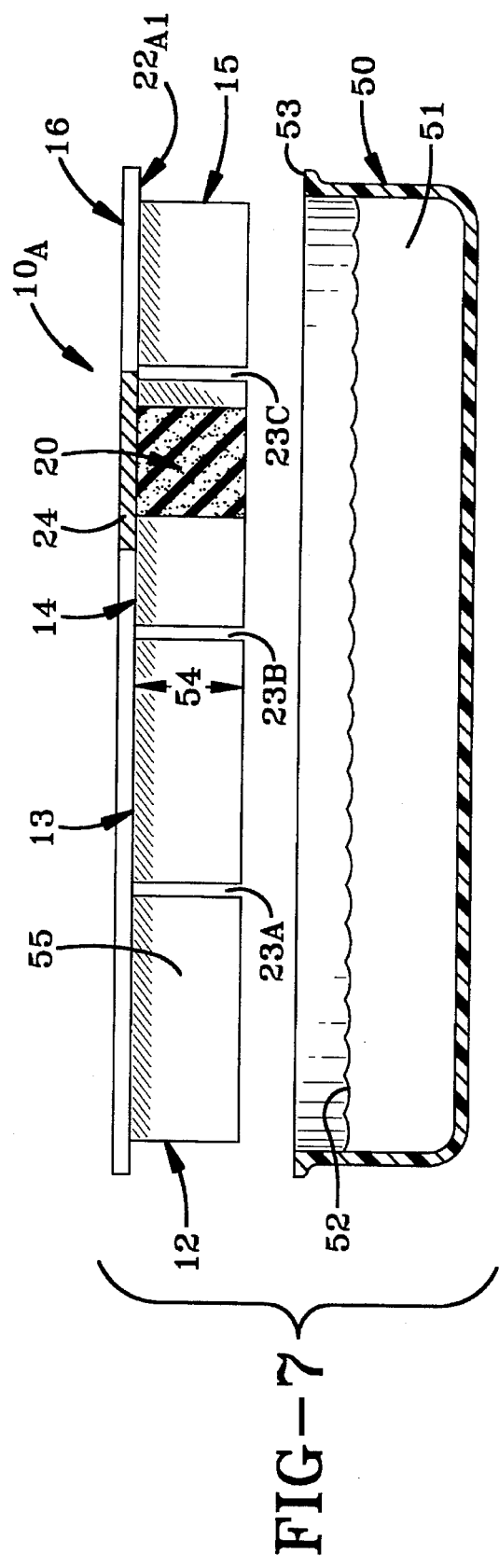
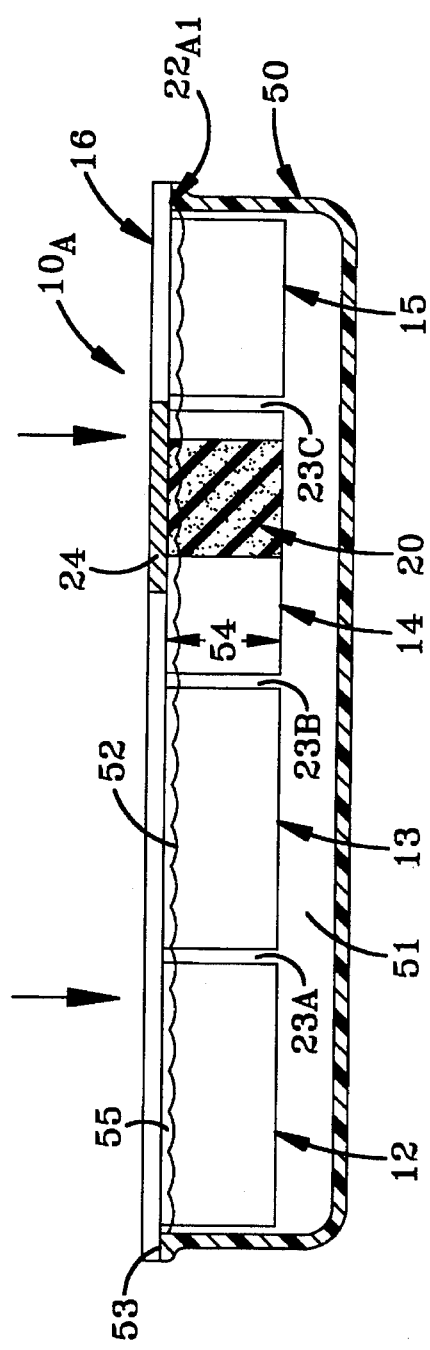
FIG-7
FIG-8

METHOD AND APPARATUS FOR DISPLAYING FLORAL ARRANGEMENTS

TECHNICAL FIELD

The present invention relates generally to foam blocks capable of absorbing and retaining liquid, and adapted to serve as a support for floral arrangements. More particularly, the present invention relates to foam block assemblies that permit floral arrangements to be displayed in other than a horizontal orientation. Specifically the present invention relates not only to a unique means for adapting floral foam block assemblies for use with displays which require that the supporting block be inclined but also to unique methods and apparatus for saturating pre-shaped floral foam block assemblies with a preservative solution prior to receiving the stems of the flowers to be supported thereby.

BACKGROUND OF THE INVENTION

When displaying fresh cut flowers it is, of course, desirable that the flowers appear fresh for as long as possible. The need to supply moisture to the stems of fresh cut flowers used in floral displays has long been recognized as one of the primary factors in maintaining a display for the maximum period of time. The fresh appearance of floral displays may be enhanced by adding a floral preservative to the water, but it is still necessary that the flower stems have continuous access to moisture, with or without preservative.

Of the many methods employed to provide water to the cut flower stems, the use of floral foam has been the most economical and the most successful. But even with the widely successful floral foams certain problems do exist. Perhaps the major problem is that floral foam blocks do not retain the fluid absorbed therein as readily when the major dimension of the block is disposed in a substantially vertical plane as they do when the major dimension of the block is disposed in a substantially horizontal plane. In short, there is a maximum vertical dimension beyond which the foam can not successfully retain the liquid absorbed therein.

Commercially available floral foams are formulated as an open-celled, phenolic based, thermoset. This product has the capability of retaining as much as ninety-four percent (94%) of the moisture that the cells of the thermoset floral foam are theoretically capable of receiving when the vertical dimension of the floral foam does not exceed about nine inches (22.86 cm). Accordingly, when it is desired to present a display that employs a floral foam block which is positioned with its major dimension disposed vertically, or near vertically, moisture retention is more difficult to achieve. Without sufficient moisture retention the flowers are unable to remain fresh for more than forty-eight (48) hours. By way of an example, when a floral display is presented from a conventional easel—which is normally inclined at an angle of approximately seventy-two (72) degrees from a horizontal frame of reference—the moisture in the floral foam will, if the major dimension of the foam is disposed at such an angle, drain from the display by the force of gravity, thereby permitting the flowers supported from the upper portion of the display to wilt. The display not only becomes unsightly, but the liquid within the foam can drain out of the foam and spill onto the floor.

To prevent the escape of moisture from pre-shaped floral displays, such as hearts, crosses and a wide variety of other geometric configurations, it has heretofore been necessary to reduce the head pressure of the fluid absorbed within the floral foam supporting the display by limiting the amount of water contained within the foam, by limiting the vertical inclination of the floral foam to a relatively modest angle or by providing a containment structure that substantially surrounds at least a portion of the floral foam. To date, the preferred method for retaining the moisture necessary to preserve the flowers has been to employ a containment structure that closely encases the floral foam. That is, a portion of the floral foam brick is encapsulated by a closely fitting wax dam.

To encapsulate the foam block with a wax dam in the manner exemplified by the prior art, the block, or brick, is generally dipped into a reservoir of heated wax so as to cover not only the base of the block but also the side walls thereof to a height compatible with the angle at which the brick is to be disposed when supporting a floral arrangement. This prior art procedure defines a reservoir within a portion of the foam block which contains the moisture that would otherwise escape when the block is inclined. However, the prior known wax dam structure is not satisfactory when the foam block has been fully saturated, and the fully saturated foam block must be tilted to such a degree that some of the moisture absorbed into the block can escape over the top of the wax dam. Hence, this method of moisture retention inherently limits the amount of moisture that can be retained within the block.

Another drawback to this method is that the moisture which is retained within the foam block will virtually all drain to the lowermost portion of the block within approximately twenty-four hours, thus leaving insufficient moisture in other parts of the block to maintain all the flowers in a fresh condition.

Another well known prior art method of providing extended life to the floral display is to utilize non-wettable foam wafers. However, this method is labor intensive and expensive. Moreover, a water reservoir must be provided for each flower, or small groups of flowers.

SUMMARY OF THE INVENTION

It is, therefore, a primary object of the present invention to provide an improved fresh flower display assembly that incorporates floral foam supporting blocks which can be oriented other than horizontally, and without causing the preservative solution absorbed into the blocks to drain out of the blocks.

It is another object of the present invention to provide an improved, fresh flower display support assembly, as above, that is capable of maintaining the flowers in a reasonably fresh condition for a time period greater than forty-eight hours.

It is a further object of the present invention to provide an improved, fresh flower display support assembly, as above, wherein the floral foam support incorporated in the display is divided into a plurality of segments with a moisture barrier interposed between successive segments thereof.

It is yet another object of the present invention to provide an improved method of preparing a pre-shaped flower support that incorporates one or more floral foam supporting blocks within which the stems of the flowers forming the display can be received.

It is an even further object of the present invention to provide an improved method, as above, by which to prepare a fresh flower support wherein the support incorporates a plurality of brick-shaped foam blocks, or segments thereof, carried on a common backing material and separated by moisture barriers.

It is an even further object of the present invention to provide an improved method, as above, by which a preservative solution may be absorbed into the floral foam blocks, or segments thereof, by floating the floral foam blocks in a container of preservative solution until the desired amount of the solution has been absorbed and then inverting the assembly to permit the solution to equilibrate within the blocks.

These and other objects of the invention, as well as the advantages thereof over existing and prior art forms, which will be apparent in view of the following detailed specification, are accomplished by means hereinafter described and claimed.

In general, a floral foam display support assembly embodying the concepts of the present invention has a backing means. Floral foam is bonded to the backing means in order to define a predetermined configuration. Moisture barrier means, preferably in the form of ambient air spaces, separate the floral foam, in at least one direction, into adjacent segments of predetermined dimensions. The barrier spaces have a predetermined configuration and/or width sufficient to prevent floral preservative solution absorbed into the foam from bridging between adjacent segments of the foam when the display support assembly is inclined with respect to a horizontal frame of reference.

The present invention is also directed to a method by which to saturate the aforesaid pre-shaped floral foam display support assembly with a floral preservative solution. The method comprises the steps of providing a container that contains preservative solution. The pre-shaped floral foam display support assembly is then floated in the solution with the foam facing the solution. The pre-shaped floral foam display support assembly is permitted to absorb the solution until the foam segments have sunk to a predetermined level within the solution. The pre-shaped foam display support assembly is then removed from the solution and placed on a horizontal surface with the backing resting on a horizontal surface. The assembly is allowed to remain in this position for a predetermined period of time in order for the solution absorbed into the foam to equilibrate through the foam segments. The stems of fresh cut flowers may then be inserted into the segments to fashion a display.

Four exemplary embodiments of pre-shaped, floral support assemblies embodying the concepts of the present invention, and adapted for use in the display of fresh cut flowers that are individually supported by floral foam, are deemed sufficient to effect a full disclosure of the subject invention, are shown by way of examples in the accompanying drawings and are described in detail, together with two methods and appropriate apparatus for saturating the floral foam with moisture (either with or without a preservative) and without attempting to show all of the various forms and modifications in which the invention might be embodied; the invention being measured by the appended claims and not by the details of the specification.

BRIEF DESCRIPTION OF THE DRAWINGS

FIG. 3 is plan view of a pre-shaped floral display in an open heart-shaped configuration and which also incorporates floral foam blocks segmented according to the concepts of the present invention;

FIG. 4 is a side elevation of the pre-shaped floral display shown in FIG. 3;

FIG. 5 is a side elevation, partly broken away, of the pre-shaped floral display support assembly shown in FIG. 1, said assembly being depicted just above the solution in the container prior to being floated on the surface of the solution according to the preferred method for absorbing the solution into the segmented foam blocks employed in the display support assembly;

FIG. 6 is view similar to FIG. 5 showing the pre-shaped floral display support assembly within the container in the position it would assume just prior to removal of the assembly from the solution;

FIG. 7 is a side elevation, partly broken away, of a modified display assembly shown in conjunction with a modified apparatus to wet the foam by a modified method, the modified display assembly being disposed with respect to a container of preservative solution in the position it would assume at the beginning of the absorption process;

FIG. 8 is a view similar to FIG. 7 showing the modified display assembly within the container in the position it would assume at the end of the absorption process;

DESCRIPTION OF AN EXEMPLARY EMBODIMENT

Figure 1:
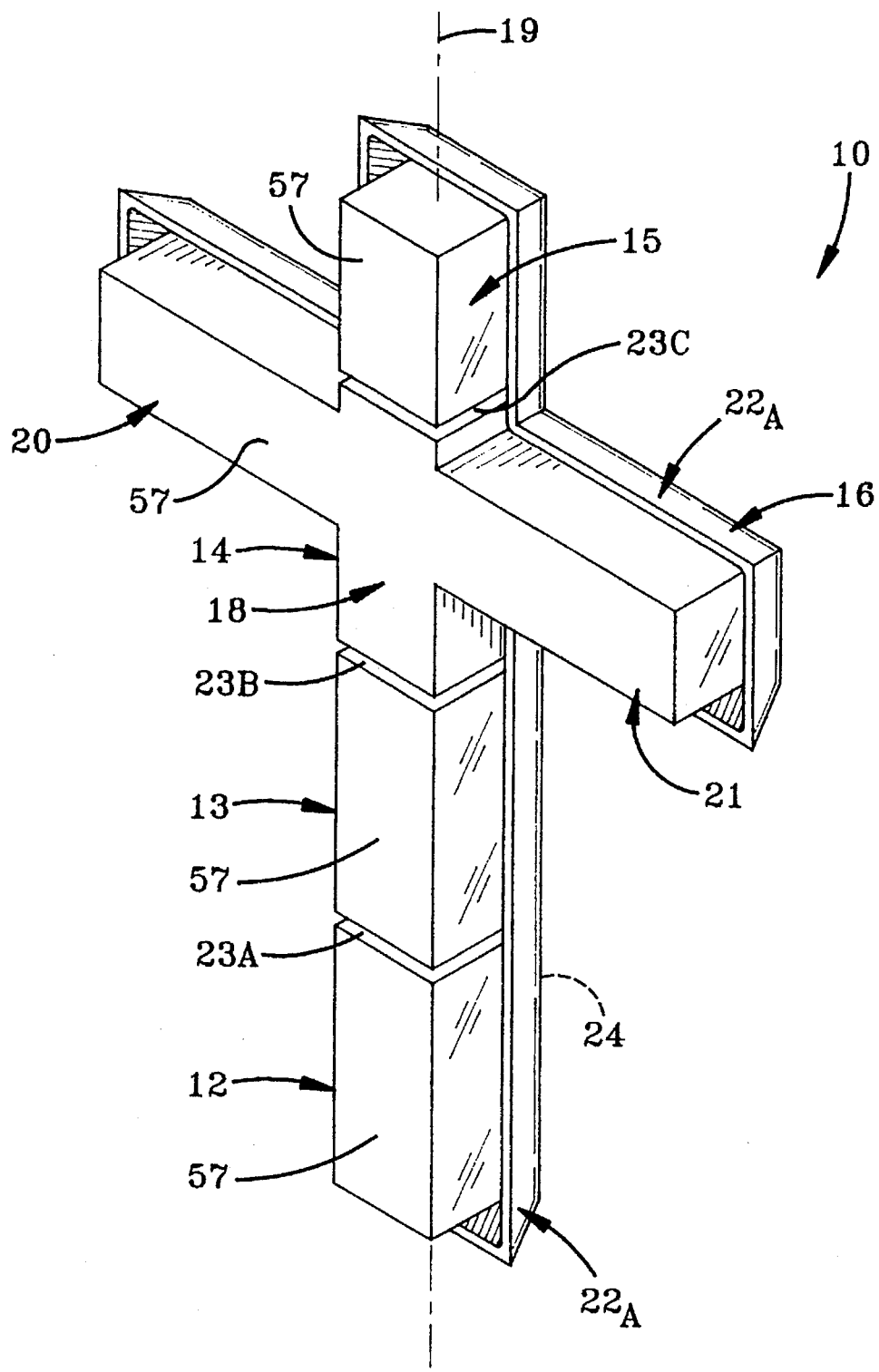
FIG. 1 is a perspective view of a floral display pre-shaped in a cruciform configuration and incorporating floral foam blocks that have been segmented in accordance with the concepts of the present invention.

One representative form of a pre-shaped floral display support assembly embodying the concepts of the present invention is designated generally by the numeral 10 on FIG. 1 of the accompanying drawings. The representative pre-shaped floral display support assembly 10 is, as shown, in the form of a cross. The cruciform display support assembly 10 employs a plurality of floral foam segments 12, 13, 14 and 15 that are made from an open-celled, phenolic based, thermoset foam. Such material is widely employed in the display of fresh cut flowers, and particularly when the floral foam can be disposed in a horizontal orientation. One such floral foam is sold under the Oasis® trademark by the Smithers-Oasis Company, the assignee of the subject invention. The segments 12–15 are bonded to a backing 16, which may be made of papier-mâché, plastic, metal or other material suitable for structural support of the display assembly. The segments 12, 13 and 15 as well as the longitudinal portion 18 of segment 14 are aligned along the longitudinal, vertical axis 19 of the cruciform display 10. The segment 14 also has lateral arm portions 20 and 21 which extend transversely outwardly in opposite directions from the longitudinal portion 18. The lateral arm portions 20 and 21 (which may be integral with, or separate from, the remainder of segment 14) are also bonded to the backing 16. The backing 16 has a peripheral rim, or edge, 22$_A$.

The precise disposition of the rim 22$_A$ is not critical, but in the preferred form depicted, the rim is splayed angularly outwardly from the base 24 of the backing 16 to be disposed along the sides of the floral foam segments 12–15 to perform at least four distinct functions—i.e.: (1) the rim adds structural rigidity to resist bending of the backing 16; (2) the rim serves as a partial water retention wall in some dispositions of the assembly; (3) the rim can serve as a visual guide during the wetting procedure, as will be hereinafter more fully explained; and, (4) the rim can lend a supporting edge for those flower stems inserted into the floral foam at locations where they will engage the rim.

It is also possible to locate a rim $22_{A1}$ in coplanar relationship with the base 24 of the backing 16—such as shown in conjunction with the modified cruciform display $10_A$ depicted in FIGS. 7 and 8. The modified rim $22_{A1}$ extends laterally and longitudinally outwardly with respect to the floral foam segments 12 through 15 to lie coplanar with the base 24. In fact, a rim 22 may be oriented at various degrees between the preferred return disposition of the rim $22_A$ depicted in FIG. 1 and the laterally extending disposition of the rim $22_{A1}$ described as an alternative arrangement and depicted in FIGS. 7 and 8.

The floral foam can be bonded to the base 24 of a pre-shaped backing 16 as a single, pre-shaped block (not shown), or the individual segments 12–15 can be formed and then bonded to the base 24 of the backing 16. For some pre-shaped display configurations the preferable construction method may well be to provide a single, pre-shaped block. Whichever construction method is employed, the longitudinal dimension of the individual segments 12–15 is established by sawing, or otherwise slicing, the floral foam to provide a moisture barrier, such as a space 23, between each of the adjacent segments 12–15. Each space 23 need only provide a separation between successive segments on the order of about one-eighth of an inch (0.32 mm), but the spaces 23 must effect a complete separation between those cells of the successive segments capable of holding fluid. In the event foam blocks are first bonded to the backing 16 those cells into which the bonding material has penetrated need not be removed, if they are incapable of absorbing liquid, or transmitting liquid therethrough. However, in order to be absolutely certain that a barrier is provided which will totally preclude the passage of fluid between the successive segments of the floral foam, the spaces 23 are preferably extended to the base 24 of the backing 16, and if the spaces 23 are cut in situ after the foam has been bonded to the backing 16, a portion of the base 24 may properly be removed in the process of providing the spaces 23. As shown, each space 23 is disposed in a plane perpendicular to the longitudinal axis 19 of the display assembly 10.

Although the moisture barrier is described as a space 23, it should be appreciated that other means may be utilized to prevent the transmission of liquid between the adjacent segments. For example, a sheet of some material that is impenetrable to moisture can be placed between adjacent segments. However, even though other forms of a moisture barrier are contemplated, the utilization of ambient air as the barrier 23 will likely be the least expensive arrangement.

As previewed above, and in the detailed description which follows, a particular structural member, component or arrangement may be employed at more than one location. When referring generally to that type of structural member, component or arrangement a common numerical designation shall be employed. However, when one of the structural members, components or arrangements so identified is to be individually identified it shall be referenced by virtue of a letter suffix employed in combination with the numerical designation employed for general identification of that structural member, component or arrangement. Thus, there are three spaces which are generally identified by the numeral 23, but the specific, individual spaces are, therefore, identified as 23A, 23B and 23C in the specification and on the drawings. As such, segments 12 and 13 are separated by barrier space 23A; segments 13 and 14 are separated by barrier space 23B; and, segments 14 and 15 are separated by barrier space 23C. This same suffix convention shall be employed throughout the specification. In addition, where one common feature is employed in each embodiment, either with or without a modest change, a common numeric identifier is employed but that numeric identifier will be associated with an alphanumeric subscript in order to distinguish the component on each embodiment from that same structural component on the other embodiments. The rim 22 on the various embodiments will be so identified.

The dimension of each segment 12–15 along the longitudinal axis 19 is, when reasonably feasible, preferably of approximately the same magnitude. The longitudinal dimension of each segment 12–15 is also preferably equal to or less than six inches (15.24 cm). As mentioned above, the pre-shaped floral foam segments can be constructed from a plurality of blocks having a maximum dimension that is somewhat greater than the desired six inches. At least the Oasis brand floral foam is normally manufactured in a standard brick size of approximately nine inches (22.86 cm) by three and one-eighth inches (7.94 cm) by four and one-quarter inches (10.8 cm). Blocks of this size can be oriented with the nine inch dimension disposed substantially parallel with the longitudinal axis 19 of the cruciform display assembly 10 and still retain approximately ninety-four percent (94%) of the water preservative solution required to effect the maximum saturation to which the floral foam brick is capable. However, a six inch (15.24 cm) dimension in the vertical direction is preferred inasmuch as that dimension will assure that the attractive forces exhibited by the cells of at least the Oasis brand foam will retain that amount of preservative solution which constitutes full saturation of each segment 12–15.

In order to assure that the desired amount of solution is retained, it is essential that the spaces completely separate the open cells of one segment from those of the adjacent segments that are, to some degree, vertically displaced with respect to each other. Typically, the separation may be assured by extending the spaces completely through the foam segments 12–15 to the backing 16. If the spaces 23 do not provide complete separation between successive segments, a bridging effect can occur which will permit drainage of the solution from the more elevated segments to the adjacent, less elevated segments by virtue of the combination of hydraulic head pressure and capillarity. It has been determined that if a conventional preservative solution is used, and any space 23 is less than one-eighth of an inch (0.32 cm), it is possible that a meniscus may form between successive segments—depending upon the surface tension of the particular preservative solution—and the meniscus will effect a temporary bridging that will allow the passage of the preservative solution from the higher to the successively lower segments. The barrier spaces 23 heretofore described will permit the pre-shaped display 10 to be presented on an easel, such as that represented in FIGS. 9 and 10, which is depicted as supporting a second heart shaped display 32, the details of which will be hereinafter more fully described, at an inclination angle $\alpha$ without the afore-described, undesirable drainage. The use of barrier spaces 23 in display 10, like the barrier spaces 63 in display 32 will effectively preclude drainage, even if the angle $\alpha$ is as large as the seventy-two (72) degree inclination customarily employed by display easels.

Figure 2:
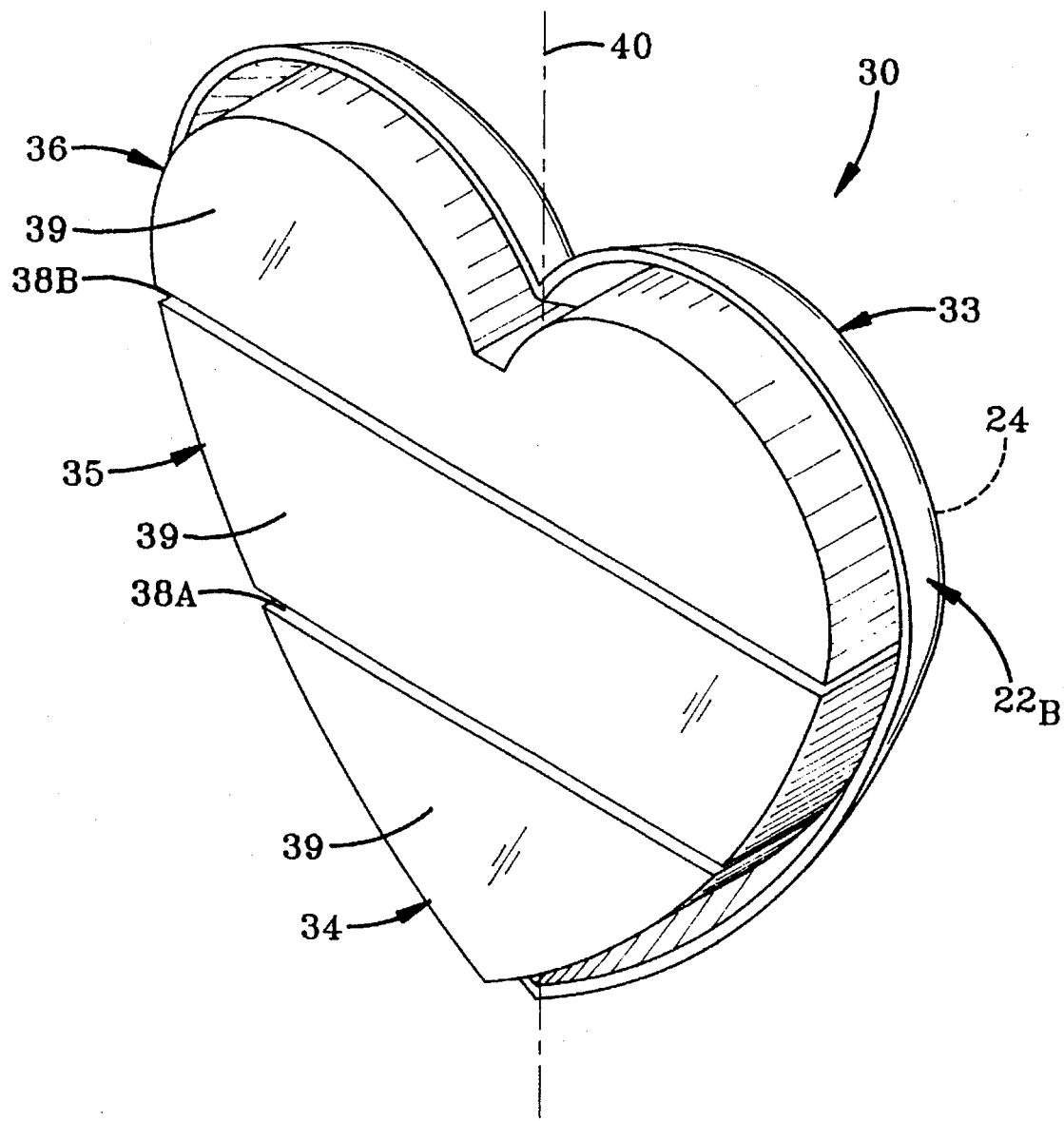
FIG. 2 is a perspective view of a pre-shaped floral display in a heart-shaped configuration and incorporating floral foam blocks that have also been segmented according to the concepts of the present invention.

As previously explained, the pre-shaped foam can be cast, or otherwise formed, as a single component that has the desired shape. The cruciform display 10 shown in FIGS. 1 and 5–8, as well as a closed, or solid, heart 30 shown in FIG. 2, the open heart 31 shown in FIGS. 3 and 4 and the open heart display 32 shown in FIGS. 9 and 10 can also be pre-formed as a single foam block. The pre-shaped, closed heart 30 (FIG. 2) is also supported from a papier-mâché (or other suitable material) backing 33 which is sized to present a return rim $22_B$. As shown, the foam blocks in the heart display support assembly 30 is divided into three segments 34, 35 and 36 which are separated by barrier spaces 38A and 38B, respectively. Each of the spaces 38 separate the successive segments 34–35 and extend from the outermost surface 39 of the segments 34–36 to at least the base 24 of the backing 33. As previously explained, the foam segments 34–36 must be completely separated from each other so that bridging will be precluded.

The three segments 34–36 of the closed heart 30 each preferably have a maximum dimension of approximately six inches (15.24 cm) when measured in the vertical direction, as defined by the axis 40. In this embodiment, therefore, the total height of the closed heart will be approximately eighteen inches (45.72 cm). As a general rule, pre-shaped floral displays are normally prepared in two or more sizes with the smaller unit being approximately twelve inches (30.48 cm) high and the larger unit being either eighteen inches (45.72 cm) or twenty-four inches (60.96 cm). These sizes are not to be considered limiting. However, the larger units will be quite heavy due to the amount of preservative solution that must be absorbed by the foam block segments in the display.

The open heart 31 depicted in FIGS. 3 and 4 is shown as a pre-shaped foam display having four segments—viz.: a tip portion 41; a pair of laterally spaced, mirror image medial segments $42_1$ and $42_2$; and, a lobe segment 43—that are secured to a backing 45 of appropriate material and separated by spaces 46. That is, barrier space $46A_1$ separates the tip segment 41 from the medial segment $42_1$; barrier space $46A_2$ separates the tip segment 41 from the medial segment $42_2$; barrier space $46B_1$ separates the medial segment $42_1$ from the lobe segment 43; and, barrier space $46B_2$ separates the medial segment $42_2$ from the lobe segment 43. These four segments 41–43 are also preferably secured to the backing 45 in such a manner that the preferred return rim $22_C$ is presented.

As explained in conjunction with the previously described embodiment, the spaces 46 extend from the outermost face 48 of each segment 41–43 to at least the base 24 of the backing 45. The segments 41–44 each have a maximum dimension of six inches (15.24 cm) when measured along their respective outermost faces 48 in a direction parallel with the longitudinal axis 49 of the open heart display assembly 31. While the open heart 31 is shown as being three segments high—to provide an overall height of approximately eighteen inches (45.72 cm)—it is possible to make the pre-shaped form larger due to the open center which will reduce the total amount of preservative solution which must be absorbed and therefore, the total weight to be supported.

The total weight of the floral display is important because a person has to lift the display onto an easel 25, and the easel must have sufficient structural strength to support the floral display.

When the foam segments are properly secured to the backing in a floral display support assembly in accordance with the present invention, the foam segments must be appropriately saturated with a preservative solution. While there are many methods which can be utilized to wet the foam segments, the following method is preferred. As shown in FIG. 5, a container 50, large enough to receive one or more of the pre-shaped floral display support assemblies 10 in a horizontal position, is used. The container 50 is at least partially filled with a floral preservative solution 51, and one or more of the pre-shaped floral display assemblies 10 are "floated" on the upper surface 52 of the solution 51, with the backing 16 located most remotely with respect to the surface 52. The foam segments 12–15 will rapidly absorb the solution 51 (on the average of from about 10 to 20 seconds), causing the pre-shaped display assembly 10 to sink at least partially into the solution 51. When the rim $22_A$ on the backing 16 of the display 10 has reached the surface 52 of the solution 51, the display assembly 10 is removed from the container 50, inverted and placed horizontally on a flat surface with the backing 16 resting thereon. The rim $22_A$ can thus be employed to provide a visual reference so the person performing the method will know when enough of the solution 51 has been absorbed onto the foam segments 12–15. As shown in FIG. 5, the rim $22_A$ has a projected vertical dimension "D", measured parallel to the dimension 54 of the foam between the base 24 of the backing 16 and the surface 57 of the segments 12–15. A dimension "D" on the order of about one-half the dimension 54 has been found to work quite well.

Figure 10:
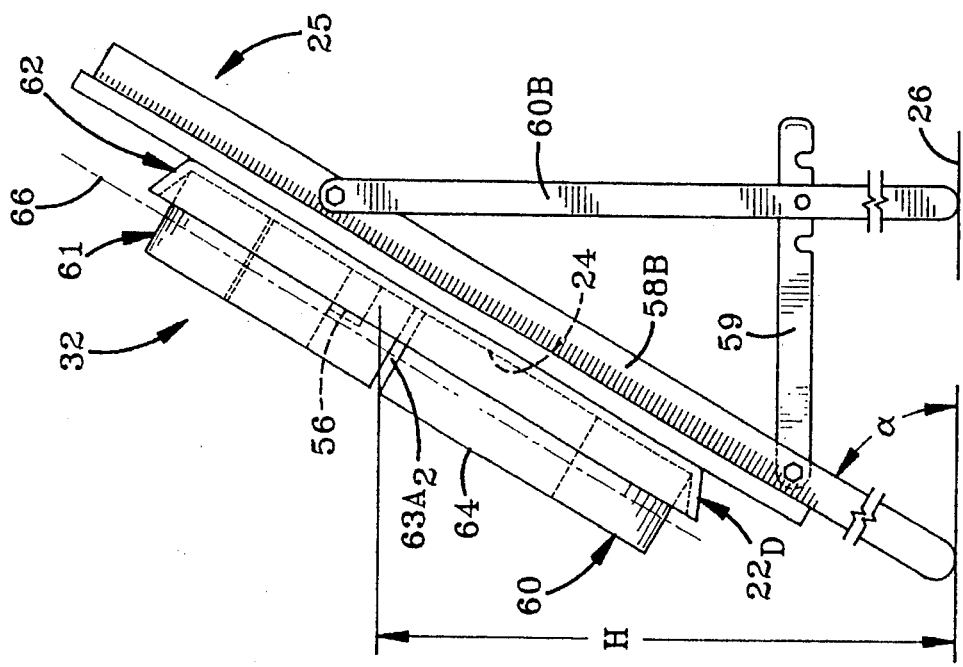
Figure 9:
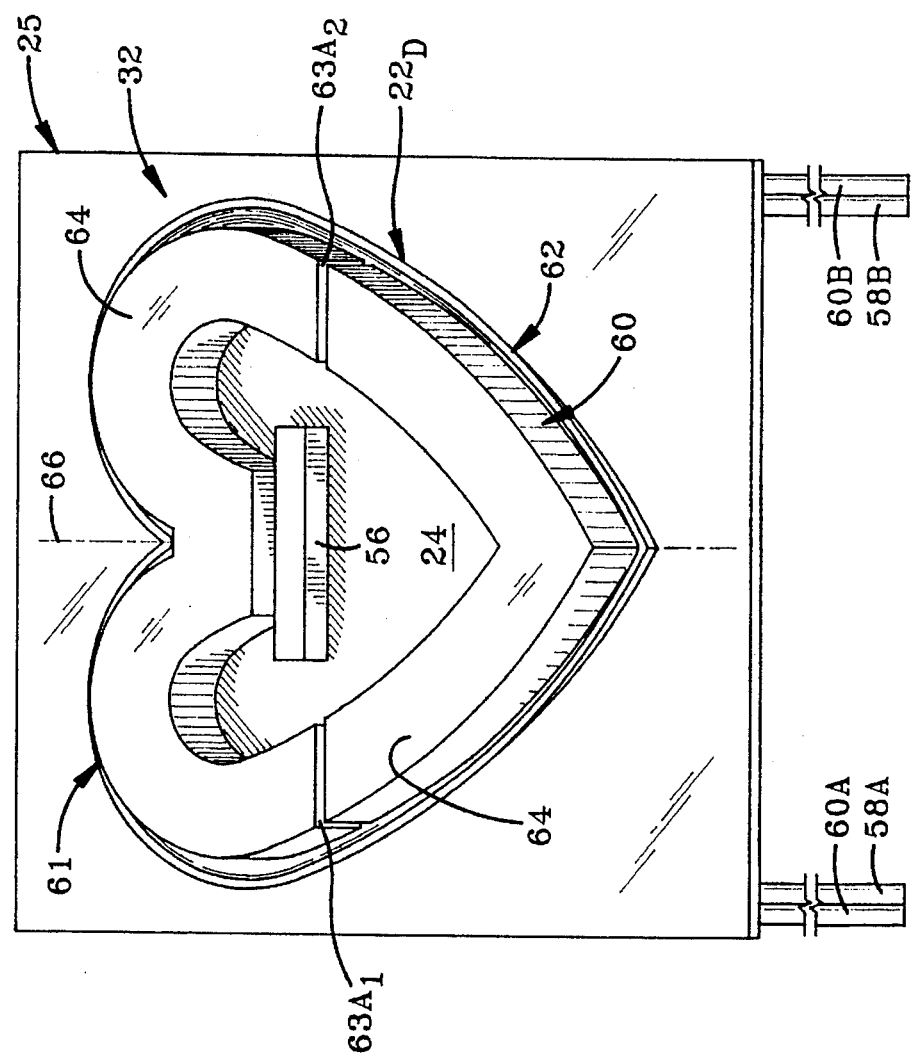
FIG. 9 is a frontal perspective of a pre-shaped floral foam display on an easel which presents the display at seventy-two degrees from horizontal; and, FIG. 10 is side elevation of the pre-shaped display shown in FIG. 9.

A second approach requires that a container 50, as seen in FIGS. 9 and 10, is filled with a preservative solution 51. The upper surface 52 of the solution 51 is displaced beneath the rim 53 of the container 50 approximately one-half the vertical dimension 54 of the foam segments to be saturated. The pre-shaped display support assembly, such as the alternative cruciform support assembly $10_A$ depicted, is "floated" on the solution with the backing 16 located most remotely with respect to the upper surface 52 of the solution 51. The foam segments 12–15 will absorb the solution, causing the support assembly $10_A$ to sink part way into the solution 51. Specifically, the display assembly $10_A$ will continue to sink until at least a portion of the rim $22_{A1}$ on the backing 16 is resting on the upper edge 53 of the container 50, as depicted in FIG. 8. When the display $10_{A1}$ has settled to that level the foam segments 12–14 are substantially saturated, and the display 10 may be removed from the solution 51, inverted and placed horizontally on a flat surface with the backing 16 resting thereon.

Irrespective of the particular wetting procedure employed, the act of positioning the pre-shaped display 10 on a horizontal surface with the backing 16 resting thereon permits the solution 51 which has been absorbed into the individual segments 12–15 to equilibrate throughout each segment 12–15. Depending upon the size of the display, the time required for the solution 51 to equilibrate through the segments may be as long as thirty minutes.

As may now be understood, when the second wetting procedure has been selected, the level of the solution 51 within the container 50 must be determined by the depth of the foam—i.e.: the dimension 54 of the side faces 55 measured perpendicularly to the base 24 of the backing 16. Thinner foam segments will require a higher solution level in the container. Oasis brand floral foam bricks have a substantially standard thickness of approximately four inches (10.16 cm). Hence, for the alternative method the surface 52 of the solution 51 should be displaced approximately 2 inches (5.08 cm) beneath the upper edge 53 of the container 50.

It should also be understood that when using the preferred method of wetting the foam segments in the display assembly 10 the level of the preservative fluid in the container 50 is important only insofar as necessary to assure that a sufficient quantity of the preservative solution is present adequately to wet the foam segments.

The open heart 32 depicted in FIGS. 9 and 10 is shown as a pre-shaped foam display having two segments—viz.: a tip segment 60; and, a lobe segment 61, both of which are secured to a backing 62 and separated by barrier spaces 63. That is, barrier space $63A_1$ separates one side of the tip segment 60 from one side of the lobe segment 61, and a barrier space $63A_2$ separates the other side of the tip segment 60 from the other side of the lobe segment 61. These segments 60 and 61 are also secured to the backing 62 in such a manner that a preferred return rim $22_D$ is provided.

As explained in conjunction with each of the previously described embodiments, the barrier spaces 63 extend from the outermost face 64 on each segment 60 and 61 to at least the base 24 of the backing 62. The segments 60 and 61 each have a maximum dimension of approximately six inches (15.24 cm) when measured along their respective outermost faces 64 in a direction parallel with the longitudinal axis 66 of the open heart display assembly 32.

As depicted, the pre-shaped open heart display support assembly 32 represented in FIGS. 9 and 10 may be presented on a standard floral display easel 25. The easel 25 presents the floral display 32 at an angle $\alpha$ from a horizontal frame of reference such as the floor 26. The easel 25 has a platform, or support structure, 56 upon which the backing 16 of the floral display 32 may rest. A pair of laterally spaced legs 58A and 58B support the platform 56 at a height "H" above the floor 26. The height H is generally selected to permit the center of the floral display to be at a height of four feet (121.92 cm) above the floor 26. A conventional bracing system, comprised of substantially horizontal locking bars 59 and rear legs 60, is employed to hold the platform 56 at the desired angle. As is well known, these bracing systems will permit the angle $\alpha$ to be adjusted within a range of angles. In the alternative, an easel having a fixed platform angle and height can be used.

Tests conducted on a variety of pre-shaped floral displays such as those previously described herein—and saturated with a typical preservative solution—revealed that the fresh cut flowers inserted in the foam will remain fresh for a time period of approximately seventy-two hours. Tests were also conducted to determine if any fluid would drain from the display when placed on a standard easel at a seventy-two degree angle similar to that shown in FIGS. 9 and 10. The results of these tests proved that the solution did not drain from the pre-shaped forms formed using the above teachings until the segments were penetrated by flower stems, and then only a minuscule amount tended to drain.

The tests were conducted on pre-shaped foam blocks, both with and without barrier spaces. The tests were conducted on pre-shaped foam displays in the form of crosses (small and large), closed hearts (small and large) and open hearts (small and large). The tests included:

1.) foam displays constructed in accordance with the present invention and saturated with preservative solution in accordance with the preferred method and apparatus of the present invention;
2.) foam displays constructed without moisture barriers but utilizing the unique method and apparatus of the present invention; and,
3.) both types of displays saturated by using a prior art immersion method.

In each instance foam blocks that were not provided with barrier spaces drained fluid for approximately two hours while the display supports using segment separated by barrier spaces did not exhibit any drainage when the preferred saturation methods and apparatus of the present invention was used. When other saturation methods were used, the foam, regardless of construction, was found to have some drainage. However in this situation the drainage from displays constructed in accordance with the present invention was considerably less than drainage from displays in which no barrier spaces were employed.

The pre-shaped floral foam displays embodying the present invention have also been found to have a significant advantage over the prior art structures which used sealing wax containment means.

The following test procedures were used not only for foam displays without barrier spaces but also for foam displays constructed in accordance with the present invention. The foam supporting block assemblies were inverted and float saturated, as previously described herein, and the saturated supporting block assemblies were then removed from the solution and placed, foam side up, on a flat, horizontal surface, and permitted to equilibrate for 30 minutes. The floral display supporting block assemblies were then placed on easels at a 72 degree angle and allowed to drip drain. The drainage was recorded at 15 minute intervals until the drainage had essentially ceased.

The following is an example of the test results that were obtained. The foam display supports without barrier spaces exhibited liquid drainage of 246 ml and 328 ml of solution front large, open and closed heart configurations, respectively; and the floral foam display supporting assemblies constructed in accordance with the present invention exhibited zero (0) ml of drainage. Flower stems were thereafter inserted into the foam, and the drainage measurements were continued. After the stems had been inserted, the foam display support assemblies without barrier spaces exhibited drainage of 121 and 77 ml for the large open and closed hearts, respectively. To the contrary, the display support assemblies constructed in accordance with the present invention exhibited drainage of zero (0) ml for the large, open heart display and 2 ml for the closed heart display.

The foregoing description of the exemplary embodiments of the invention have been presented for the purposes of illustration and description. It is not intended to be exhaustive or to limit the invention to the precise configurations disclosed. For example, shapes other than hearts and crosses are contemplated. Obvious modifications or variations are possible in light of the above teachings. These embodiments were chosen and described to provide the best illustration of the principles of the invention and its practical application thereby to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

As should now be apparent, the present invention not only teaches that a fresh flower display support assembly embodying the concepts of the present invention permits a floral display supported thereon to be displayed other than horizontally without causing the preservative solution to drain but also accomplishes the other objects of the invention.

We claim:

1. A floral display support assembly comprising:
   backing means;
   floral foam bonded to said backing means to define a pre-shaped display configuration having a longitudinal axis;

said floral foam being an open-celled thermoset capable of absorbing moisture;

moisture barrier means oriented transversely of said longitudinal axis and separating said floral foam into adjacent segments;

said longitudinally adjacent segments being separated along said longitudinal axis by said moisture barrier means to prevent the formation of a bridging meniscus between successive, longitudinally disposed segments;

said segments having a dimension along said longitudinal axis that is no greater than will assure moisture retention within each segment by minimizing hydraulic head pressure and capillarity.

2. A floral display support assembly, as set forth in claim 1, wherein said moisture barrier means comprises:

barrier spaces formed between the adjacent segments;

said spaces completely separating said segments.

3. A floral display support assembly, as set forth in claim 2, wherein:

each segment is saturated with a preservative solution;

said spaces have a predetermined width which will prevent the solution from bridging between adjacent segments when the floral foam support assembly is inclined with respect to a horizontal frame of reference.

4. A floral display support assembly, as set froth in claim 2, wherein:

said barrier spaces are approximately one-eighth of an inch, measured parallel to said longitudinal axis.

5. A floral display support assembly, as set forth in claim 1, wherein:

the longitudinal dimension of each said segment is no greater that approximately six inches.

6. A floral display support assembly, as set forth in claim 5, wherein:

said backing presents a rim;

said backing also has a base;

said floral foam is bonded to said base;

said rim extends outwardly from said base and on that side of said base to which the foam segments are bonded.

7. A floral display support assembly, as set forth in claim 6, wherein:

said rim extends angularly outwardly of said base.

8. A method of saturating a pre-shaped floral display support assembly having a plurality of foam segments bonded to a backing, said method comprising the steps of:

providing a container;

filling the container with at least a sufficient volume of wetting solution to saturate the foam segments on one or more display support assemblies;

floating the pre-shaped floral foam display support assembly in the solution with the foam segments facing the solution;

permitting the pre-shaped floral foam display support assembly to float in the solution until the foam segments are substantially saturated;

removing the pre-shaped floral display support assembly from the solution; and, placing the pre-shaped floral display support assembly on a horizontal surface for a predetermined time with the backing resting on the horizontal surface.

9. A method of saturating a pre-shaped floral display support assembly, as set forth in claim 8, comprising the further steps of:

providing a rim on the backing;

allowing the support assembly to sink into the solution until the rim reaches a predetermined vertical relationship with respect to the surface of the solution.

10. A floral display support assembly saturated with preservative solution in accordance with the method of claim 8.

11. A method of saturating a pre-shaped floral display support assembly having a plurality of foam segments bonded to a backing which has a rim that extends outwardly of the foam segments, said method comprising the steps of:

providing a container having an upper edge;

filling the container with a preservative solution to within a predetermined distance of the upper edge; floating the pre-shaped floral foam display support assembly in the solution with the foam segments facing the solution;

permitting the pre-shaped floral foam display support assembly to float in the solution until the foam segments are substantially saturated;

removing the pre-shaped floral display support assembly from the solution; and, placing the pre-shaped floral display support assembly on a horizontal surface for a predetermined time with the backing resting on the horizontal surface.

12. A method, as set forth in claim 11, comprising the further steps of:

permitting the pre-shaped floral support assembly to float in the solution until the backing engages the upper edge of the container.

13. A floral display support assembly saturated with preservative solution in accordance with the method of claim 11.

* * * * *